Patented May 16, 1933

1,908,712

UNITED STATES PATENT OFFICE

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF MAKING DIBENZANTHRONE

No Drawing. Application filed November 30, 1928. Serial No. 322,964.

This invention relates to improvements in the production of dibenzanthrone (Indanthrene dark blue BO, Colour Index #1099) by the fusion of benzanthrone with caustic alkali.

It has heretofore been proposed to produce dibenzanthrone by fusing 1 part benzanthrone with 6 parts caustic potash at a temperature of about 250° C., with the addition of a sugar, such as glucose, to the fused caustic before addition of the benzanthrone thereto (E. P. 126,765). When the fusion is carried out in this way, excessive foaming results and the fusion mass becomes viscous and difficult to stir toward the end of the reaction.

It has also been proposed to carry out the fusion with 1 part benzanthrone, 1 part caustic potash and 4.2 parts of a high boiling mineral oil at a temperature of 215°–230° C. with the addition of an organic reducing agent, such as dextrine (U. S. Patent 1,583,258). As thus carried out, the removal of the last traces of the mineral oil is difficult. It has also been proposed to carry out the fusion using from 1.5 to 4 parts caustic potash per part of benzanthrone, without the use of dextrine or other organic reducing material, and in the presence of solvents such as monochlorbenzene, naphthalene, or an alcohol, but the recovery of the solvent introduces a disadvantage.

The products above obtained contain large amounts of a non-vatable substance having practically no tinctorial value, and a vatable portion comprising essentially dibenzanthrone, which has tinctorial properties. The non-vatable substance not only has little or no utility as a dyestuff, but is a diluent of the dyestuff and therefore is preferably removed. The elimination of this non-vatable substance is accomplished (U. S. Patent 1,478,027) by treating the fusion mass with dilute caustic soda solution and hydrosulfite, whereby the dyestuff is reduced to its leuco form and goes into solution, while the insoluble non-vatable portion is filtered off. The filtrate is then blown with air to precipitate the dyestuff.

One of the objects of this invention is to reduce the proportion of caustic potash to benzanthrone used in the fusion, without the use of diluents, and without unduly increasing the viscosity of the melt. Another object is to increase the output of the equipment without increasing its size. Another object is the production of dibenzanthrone mostly, if not all, in the reduced state. Still another object is to decrease the quantity of hydrosulfite subsequently needed for purifying the dyestuff. These and other objects will be readily apparent to those skilled in the art from a consideration of the disclosure in the specification and claims.

According to the present invention, it has been found that in the production of dibenzanthrone the proportion of caustic potash to benzanthrone in the fusion can be considerably reduced without materially increasing the viscosity of the melt, and without necessitating the use of a solvent, a diluent, or an organic reducing agent. The present invention particularly contemplates the fusion of 1 part benzanthrone with as little as about 2.5 parts caustic potash in the presence of a finely divided metal which is capable of reacting with caustic alkali to produce hydrogen, as a reducing agent. The resulting product contains the dibenzanthrone mostly, if not all, in the reduced or leuco state.

The invention will be illustrated by the following example, but it will be understood that the invention is not limited thereto. The parts are by weight.

*Example.*—185 parts caustic potash (about 86% KOH) is heated to about 220°–230° C. with constant agitation in a covered iron fusion kettle equipped with a propeller agitator, a feed line for the introduction of gases, and a manhole for the introduction of solid material. A current of ammonia gas is continuously passed through the fusion kettle to sweep out and exclude air. A mixture of 67 parts powdered benzanthrone (about 90% pure) and 4.4 parts aluminum powder or aluminum bronze is introduced into the fusion kettle through the manhole as fast as is possible without causing excessive foaming. When all of the mixture has been added, the melt is heated at about 235°–240° C. for about one hour longer, or until the reaction is completed. It is then treated with about 5000–6000 parts of water, and a sufficient amount of hydrosulfite, if necessary, to reduce the dyestuff to the leuco condition, and the insoluble material is filtered off. The filtrate is then blown with air to precipitate the dyestuff.

In the foregoing example, the molecular ratio of caustic potash to benzanthrone is about 11 to 1. Higher or lower molar proportions of caustic may be used, if desired, but the proportions given in the above example are those preferred. Part of the caustic potash may be replaced by caustic soda if desired.

While the function of the finely divided metal used in this process is not definitely known, it is believed that the metal has a reducing action in the fusion which is due to the nascent hydrogen produced. This theory is supported by the fact that the dibenzanthrone thus produced is mostly in its leuco form. By excluding air from the fusion, the color produced is preserved in its leuco form, so that less hydrosulfite is required subsequently to accomplish its solution for the purpose of purification.

The viscosity of the fusion mass is less than when an organic reducing agent is used in the fusion. Consequently, agitation can be carried out readily throughout the fusion, thus preventing local overheating and increased formation of by-products. The process does not entail the recovery of solvents since none are used.

In place of the aluminum powder, an equivalent portion of finely divided zinc or other metal which is capable of reacting with caustic alkali to produce hydrogen may be used with almost equally good results. It is desirable that the metal used shall be finely divided so as to secure a quick reaction between the metal and the caustic.

Care should be taken to remove the air from the fusion kettle, since otherwise it may form an explosive mixture with the hydrogen evolved. For this purpose, the air space in the fusion kettle is swept by a stream of ammonia gas or other inert gas which preserves a non-oxidizing atmosphere in the fusion kettle. Exclusion of air from the fusion kettle is desirable also for the reason that oxidation of the leuco dyestuff during the fusion is prevented.

It is obvious that various changes may be made in the example given without departing from the spirit or scope of the invention as defined in the following claims.

I claim:

1. In the production of dibenzanthrone, the process which comprises fusing together benzanthrone, caustic alkali, and a finely divided metal which is capable of reacting with caustic alkali to produce hydrogen.

2. In the production of dibenzanthrone, the process which comprises fusing together benzanthrone, caustic potash and finely divided aluminum.

3. In the production of dibenzanthrone, the improvement which comprises fusing together benzanthrone, caustic potash and a finely divided metal which is capable of reacting with caustic potash to produce hydrogen.

4. In the production of dibenzanthrone, the process which comprises heating 185 parts caustic potash, 67 parts powdered benzanthrone and 4.4 parts finely divided aluminum at a temperature of about 220°–230° C.

5. In the production of dibenzanthrone, the process which comprises heating benzanthrone, caustic potash and a finely divided metal which is capable of reacting with caustic potash to produce hydrogen, at a temperature of 220°–240° C.

6. In the production of dibenzanthrone, the process which comprises heating caustic potash to about 220°–230° C., adding thereto in small portions a mixture of benzanthrone with a finely divided metal which is capable of reacting with caustic potash to produce hydrogen, and heating at about 235°–240° C. until reaction is complete.

7. In the production of dibenzanthrone, the process which comprises heating caustic potash to about 220°–230° C., adding thereto in small portions a mixture of benzanthrone with finely divided aluminum, and heating at about 235°–240° C. until reaction is complete.

8. In the production of dibenzanthrone, the process which comprises fusing together about 67 parts benzanthrone, about 185 parts caustic potash and a finely divided metal which is capable of reacting with caustic potash to produce hydrogen.

9. In the production of dibenzanthrone, the process which comprises fusing together about 67 parts benzanthrone, about 185 parts caustic potash and finely divided aluminum.

10. In the production of dibenzanthrone, the process which comprises fusing benzanthrone with about 2.5 times its weight of caustic potash and with a finely divided metal which is capable of reacting with caustic potash to produce hydrogen.

11. In the production of dibenzanthrone, the improvement which comprises fusing caustic potash, adding benzanthrone and finely divided aluminum thereto, and fusing the resulting mixture.

12. In the production of dibenzanthrone, the process which comprises heating, caustic alkali, a finely divided metal which is capable of reacting with caustic alkali to produce hydrogen, and benzanthrone at a reaction temperature.

13. In the production of dibenzanthrone, the process which comprises heating benzanthrone, caustic potash and finely divided aluminum at a reaction temperature.

14. In the production of dibenzanthrone, the process which comprises fusing together benzanthrone, caustic alkali, and a finely divided metal which is capable of reacting with caustic alkali to produce hydrogen, while excluding air from the reaction mixture.

15. In the production of dibenzanthrone, the process which comprises fusing together benzanthrone, caustic alkali, and a finely divided metal which is capable of reacting with caustic alkali to produce hydrogen, while maintaining an atmosphere of ammonia in contact with the reaction mixture.

16. In the production of dibenzanthrone, the improvement which comprises fusing together benzanthrone, caustic potash and a finely divided metal which is capable of reacting with caustic potash to produce hydrogen, while maintaining a non-oxidizing atmosphere in contact with the reaction mixture.

17. In the production of dibenzanthrone, the process which comprises fusing caustic potash at a temperature of 220° to 240° C., adding thereto in small portions a mixture of benzanthrone and aluminum powder, fusing the resulting mixture, and excluding air by maintaining an atmosphere of ammonia in contact with the reaction mixture.

In testimony whereof I affix my signature.

LUCAS P. KYRIDES.